United States Patent
Kang et al.

(10) Patent No.: US 9,690,027 B2
(45) Date of Patent: Jun. 27, 2017

(54) OPTICAL FILM AND METHOD OF PREPARING SAME

(71) Applicant: LG CHEM, LTD., Seoul (KR)

(72) Inventors: Byoung-Il Kang, Daejeon (KR); Chang-Hun Han, Daejeon (KR); Jung-A Yoo, Daejeon (KR); Song-Taek Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 206 days.

(21) Appl. No.: 14/565,038

(22) Filed: Dec. 9, 2014

(65) Prior Publication Data

US 2015/0085362 A1  Mar. 26, 2015

Related U.S. Application Data

(62) Division of application No. 13/122,185, filed as application No. PCT/KR2009/005632 on Oct. 1, 2009, now Pat. No. 8,951,643.

(30) Foreign Application Priority Data

Oct. 2, 2008 (KR) ........................ 10-2008-0097400

(51) Int. Cl.
| | |
|---|---|
| *G02B 5/30* | (2006.01) |
| *C08L 33/08* | (2006.01) |
| *C08L 51/04* | (2006.01) |
| *C08J 5/18* | (2006.01) |
| *G02F 1/13363* | (2006.01) |
| *G02F 1/1333* | (2006.01) |

(52) U.S. Cl.
CPC ............ *G02B 5/3083* (2013.01); *C08J 5/18* (2013.01); *C08L 33/08* (2013.01); *G02F 1/13363* (2013.01); *C08J 2333/10* (2013.01); *C08J 2333/12* (2013.01); *G02F 2001/133311* (2013.01); *G02F 2001/133635* (2013.01); *G02F 2201/50* (2013.01); *Y10S 525/902* (2013.01); *Y10T 428/31721* (2015.04); *Y10T 428/31931* (2015.04)

(58) Field of Classification Search
None
See application file for complete search history.

(56) References Cited

U.S. PATENT DOCUMENTS

| | | | |
|---|---|---|---|
| 4,888,401 A | 12/1989 | Kawaki et al. | |
| 5,093,739 A * | 3/1992 | Aida | ............... G02F 1/13363 349/120 |
| 5,212,251 A | 5/1993 | Lorah et al. | |
| 5,959,033 A | 9/1999 | Demirors et al. | |
| 6,927,257 B2 | 8/2005 | Akada et al. | |
| 2005/0275334 A1 | 12/2005 | Park et al. | |
| 2006/0186803 A1 | 8/2006 | Lim et al. | |
| 2007/0243364 A1 | 10/2007 | Maekawa et al. | |
| 2009/0135483 A1 | 5/2009 | Asano et al. | |
| 2010/0087605 A1 * | 4/2010 | Yamamoto | ............ C08F 220/14 526/64 |

FOREIGN PATENT DOCUMENTS

| | | |
|---|---|---|
| JP | 2003-128873 A | 5/2003 |
| JP | 2006-241197 A | 9/2006 |
| JP | 2006-284882 A | 10/2006 |
| JP | 2007-254726 A | 10/2007 |
| JP | 2008-009378 A | 1/2008 |
| KR | 10-2005-016716 A | 11/2005 |
| KR | 10-0604735 A | 7/2006 |
| KR | 10-0624307 B1 | 9/2006 |
| KR | 10-2007-0006928 A | 1/2007 |
| KR | 10-2008-0004720 A | 1/2008 |
| KR | 10-0856137 B1 | 9/2008 |
| WO | 2007-061041 A1 | 5/2007 |
| WO | 2007-099826 A1 | 9/2007 |
| WO | 2007-129835 A1 | 11/2007 |
| WO | WO 2008/035601 * | 3/2008 |
| WO | 2009-020261 A1 | 2/2009 |

* cited by examiner

*Primary Examiner* — Jeffrey Mullis
(74) *Attorney, Agent, or Firm* — Dentons US LLP

(57) ABSTRACT

The present invention relates to an optical film and method of manufacturing the same. The optical film of the present invention includes an acrylic resin and a core-shell type graft copolymer wherein the core includes a conjugate diene rubber, and the shell includes an acrylic monomer, an aromatic vinyl monomer, and a maleimide monomer.

4 Claims, No Drawings

OPTICAL FILM AND METHOD OF PREPARING SAME

This application is a divisional application of U.S. patent application Ser. No. 13/122,185, filed on Apr. 1, 2011, which is the national stage application of PCT/KR2009/005632, filed on Oct. 1, 2009, which claims priority to and benefit of Korean Patent Application No. 10-2008-0097400, filed on Oct. 2, 2008 in the Korean Intellectual Property Office, all of which are incorporated herein by reference.

TECHNICAL FIELD

The present invention relates to an optical film and a method of manufacturing the same. More specifically, the present invention relates to an optical film that has excellent impact resistance, heat resistance, and the like, and a method of preparing the same. The optical film may be usefully applied to an electronic device such as a display device including an LCD.

BACKGROUND ART

In recent years, in accordance with the advance in optical technology, various types of display technologies such as plasma display panels (PDP), liquid crystal displays (LCD), organic/inorganic electroluminescent displays (ELD) and the like have been suggested and sold in the market instead of a known cathode-ray tube. In the above-mentioned displays, the use of various types of plastic films has been suggested and the required characteristics thereof have been sophisticated. For example, in the case of liquid crystal displays, in order to obtain product slimness and lightness as well as to improve display characteristics, various types of plastic films are used in a polarizing plate, a retardation film, a plastic substrate, a light guide plate, and the like.

In general, the polarizing plate has a structure in which the triacetyl cellulose film (hereinafter, referred to as TAC film) as a protective film is laminated by using an aqueous adhesive made of a polyvinyl alcohol aqueous solution on a polarizer. However, both the polyvinyl alcohol film used as the polarizer and the TAC film used as the protective film for a polarizer have poor heat and humidity resistance. Therefore, if a polarizing plate which is made of the films is used in a high temperature or high humidity atmosphere for a long period of time, the degree of polarization may be reduced, the polarizer and the protective film may be separated from each other, or optical properties may be reduced. Thus, in terms of the purposes, there are various limits. In addition, in the case of the TAC film, a change in in-plane retardation ($R_{in}$) and thickness retardation ($R_{th}$) is significant according to a change in the ambient temperature/humidity atmosphere. In particular, a change in retardation in respect to incident light at an inclined direction is significant. If a polarizing plate that includes a TAC film having the above-mentioned characteristics as a protective film is applied to a liquid crystal display, the viewing angle characteristics are changed according to the change in the ambient temperature/humidity of the surrounding atmosphere, thus reducing image quality. In addition, in the case of the TAC film, a change in dimension is significant according to the change in the ambient temperature/humidity of the surrounding atmosphere and the photoelastic coefficient is relatively high, thus, after evaluation in respect to durability in a heat resistant and humidity resistant atmosphere, a change in retardation characteristics occurs locally, thereby easily reducing the image quality.

As a material used to avoid the disadvantages of the TAC film, a (meth)acrylic resin is well known. However, it is known that (meth)acrylic resin is easily broken or split, causing problems in terms of transportability during the production of the polarizer plate and that the productivity thereof is poor. In addition, when an acrylate resin is used as a material of a film, it is necessary that a casting process be used, and thus there are problems in that it is difficult to perform the process and the costs are high.

In the case of the retardation film, the film that is made of a styrene resin is a material that shows optical anisotropic properties that the refractive index is increased in a direction perpendicular to the alignment direction when the film is stretched and aligned, and it is known that the film is stretched to be used for manufacturing the film having the positive thickness retardation ($R_{th}$). In addition, there are advantages in that the styrene resin has excellent economic efficiency and transparency. However, there are problems in that the heat resistance is insufficient and the mechanical properties are poor except for when costly special monomers are used together to perform the manufacturing process.

In addition, a biaxially-stretched polycarbonate film or a film including a uniaxially-stretched cyclic olefin polymer (COP) on which liquid crystal is coated is used as a compensation film or a retardation film. However, in the case of the biaxially-stretched polycarbonate film, there are problems in that the retardation varies depending on a wavelength of incident light, leading to imperfect retardation compensation. In the case of the liquid crystal coated COP, there are problems in that the price is high and the processes are complex.

Although an acrylic copolymer that has excellent heat resistance and transparency has been studied in order to solve the above-mentioned problems, sufficient impact resistance cannot be attained by using only the acrylic copolymer, and the copolymer may be easily split or broken. Thus, various types of tenacity modifiers are added to secure impact resistance. In this case, if a large amount of a tenacity modifier is used for sufficient impact resistance, heat resistance and transparency are reduced. If the molecular weight of the tenacity modifier is increased, it is difficult to produce and process the copolymer.

DISCLOSURE

Technical Problem

An aspect of the present invention provides an optical film that can be easily manufactured by using an extrusion process at low cost and has excellent impact resistance and heat resistance, and a method of manufacturing the same. In the case of the optical film, since the optical isotropic properties are excellent before stretching, the film can be used for various types of purposes such as a polarizing plate protective film, and after stretching, since it is possible to provide uniform and stable retardation, the film can be applied to a retardation film.

Technical Solution

According to an aspect of the present invention, there is provided an optical film including: an acrylic resin and a core-shell type graft copolymer wherein the core includes a conjugate diene rubber, and the shell includes an acrylic monomer, an aromatic vinyl monomer, and a maleimide monomer.

According to another aspect of the present invention, there is provided a method of manufacturing an optical film, the method including: preparing a resin composition including an acrylic resin and a core-shell type graft copolymer wherein the core includes a conjugate diene rubber, and the shell includes an acrylic monomer, an aromatic vinyl monomer, and a maleimide monomer, and using the resin composition to form the film.

According to another aspect of the present invention, there is provided a retardation film including: an acrylic resin and a core-shell type graft copolymer wherein the core includes a conjugate diene rubber, and the shell includes an acrylic monomer, an aromatic vinyl monomer, and a maleimide monomer.

According to another aspect of the present invention, there is provided a method of manufacturing a retardation film, the method including: preparing a resin composition including an acrylic resin and a core-shell type graft copolymer wherein the core includes a conjugate diene rubber, and the shell includes an acrylic monomer, an aromatic vinyl monomer, and a maleimide monomer, using the resin composition to form the film, and uniaxially or biaxially stretching the film.

According to another aspect of the present invention, there is provided a retardation film having an in-plane retardation value of about 100 nm to about 120 nm, represented by Mathematical Formula 1 and a thickness retardation value of about 20 nm to about 60 nm, represented by Mathematical Formula 2.

$R_{in}=(n_x-n_y)\times d$    Mathematical Formula 1

$R_{th}=[(n_x+n_y)/2-n_z]\times d$    Mathematical Formula 2

In Mathematical Formulas 1 and 2, $n_x$ is a refractive index in a direction in which the index is largest, in the film plane,
$n_y$ is a refractive index in a direction perpendicular to the $n_x$ direction, in the film plane,
$n_z$ is a refractive index in a thickness direction, and
d is film thickness.

According to another aspect of the present invention, there is provided a polarizing plate including the optical film.

According to another aspect of the present invention, there is provided an electronic device including the optical film or retardation film.

Advantageous Effects

An optical film according to the present invention may replace relatively expensive TAC resins that have conventionally been used since the film has excellent impact resistance and heat resistance, the optical isotropic properties are excellent before the stretching, and thus the film can be used for various types of purposes such as a polarizing plate protective film. After the film is stretched, it is possible to provide uniform and stable retardation, and thus the film may be used as a retardation film. In addition, since the optical film according to the present invention can be easily manufactured by using an extrusion process at low cost, the film has better effects than a film that is made only of a conventional acrylate resin.

BEST MODE

Exemplary embodiments of the present invention will now be described in detail.

An optical film according to the present invention includes an acrylic resin and a core-shell type graft copolymer wherein the core includes a conjugate diene rubber, and the shell includes an acrylic monomer, an aromatic vinyl monomer, and a maleimide monomer.

In the optical film according to the present invention, an acrylic resin well known in the art may be used, and in particular, a homo- or copolymer of an acrylic monomer; a copolymer of an acrylic monomer and an aromatic vinyl monomer; or a copolymer of an acrylic monomer, an aromatic vinyl monomer, an acid anhydride, and the like may be used.

It is more preferable to use an acrylic monomer, an aromatic vinyl monomer, and an acid anhydride as the acrylic resin in 1).

The acrylic monomer may be a compound having a double bond between conjugated carbons and carbonyl group of an ester group, and a substituent group thereof is not specifically limited. In the specification, it is to be understood that the term "acrylic monomer" refers to acrylate and an acrylate derivative, and also includes alkyl acrylate, alkyl methacrylate, alkyl butacrylate and the like. For example, examples of the acrylic monomer include a compound that is represented by the following Formula 1.

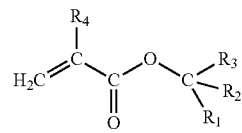

Formula 1

In Formula 1,
$R_1$, $R_2$, and $R_3$ each independently represent a hydrogen atom or a monovalent hydrocarbon group having 1 to 30 carbon atoms with or without a heteroatom, at least one of $R_1$, $R_2$ and $R_3$ may be an epoxy group, and $R_4$ represents a hydrogen atom or an alkyl group having 1 to 6 carbon atoms.

Specifically, the acrylic monomer may be at least one selected from the group consisting of methylacrylate, ethylacrylate, methylmethacrylate, ethylmethacrylate, methylethacrylate, and ethylethacrylate, and in particular, it is most preferable that methylmethacrylate (MMA) may be used.

The aromatic vinyl monomer may be a monomer having a structure, in which a benzene core is substituted or unsubstituted with one or more $C_1$ to $C_5$ alkyl groups or halogen groups. For example, the monomer may be at least one styrene monomer selected from the group consisting of styrene, α-methylstyrene, p-methylstyrene, and vinyltoluene.

The acid anhydride may be a carboxylic acid anhydride, and a monovalent- or a polyvalent (including bivalent or more) carboxylic acid anhydride. A maleic acid anhydride or derivatives thereof may be used, and for example, a compound represented by the following Formula 2 may be used.

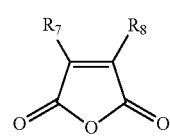

Formula 2

In Formula 2,
$R_7$ and $R_8$ each independently represent a hydrogen atom or an alkyl group having 1 to 6 carbon atoms.

When a copolymer of an acrylic monomer, an aromatic vinyl monomer, and an acid anhydride is used as the acrylic resin in 1), the weight ratio of each monomer is preferably (60~98):(1~45):(1~15).

The acrylic monomer may contribute to optical properties, the aromatic vinyl monomer may contribute to moldability and retardation of the film, and the acid anhydride may contribute to heat resistance.

The acrylic resin may be polymerized by using a method known in the art, for example, a bulk polymerization method.

The copolymers may further include a maleimide monomer as an additional comonomer. Examples of the maleimide monomer may include phenylmaleimide, cyclohexylmaleimide, and the like. The comonomer is preferably contained in an amount of about 5 parts or less by weight based on 100 parts by weight of the copolymer. A maleimide monomer may be further included as the comonomer to further enhance compatibility with a core-shell type graft copolymer having an increased heat resistance in the shell.

The acrylic resin may have a glass transition temperature of about 110° C. or more, preferably about 115° C. or more, a weight average molecular weight of about 100,000 to about 180,000, a haze of about 2.0% or less, a melt index (MI) of about 2 to about 10, and a refractive index of about 1.490 to about 1.520.

The optical film according to the present invention is characterized in that it includes a core-shell type graft copolymer including a conjugate diene rubber component in addition to an acrylic resin.

Since stability under UV light and heat resistance are required for film materials used in an image display device such as an LCD, it is known that conjugate diene compounds including a double bond are not used. However, the conjugate diene rubber component may be used in the form of a copolymer having a specific structure, and at the same time components of the copolymer and compositions thereof may be controlled to enhance the toughness of the film according to the type of the conjugate diene compound and solve the deterioration of stability and heat resistance, which is known as a limitation in conventional conjugate diene compounds.

In the optical film according to the present invention, the core of the core-shell type graft copolymer includes a conjugate diene rubber.

Examples of the conjugate diene rubber may include an ethylene-propylene diene rubber, a styrene-butadiene rubber, a butadiene rubber, and the like, and it is more preferable to use a butadiene rubber.

The core of the core-shell type graft copolymer may use a conjugate diene rubber only, and a copolymer of a conjugate diene rubber and an acrylic monomer.

The conjugate diene rubber is preferably contained in an amount of about 10 to about 60 parts by weight based on 100 parts by weight of the core-shell type graft copolymer in 2). When an acrylic monomer is added to the core, the acrylic monomer is preferably contained in an amount of about 10 parts or less by weight based on 100 parts by weight of the core-shell type graft copolymer.

The shell of the core-shell type graft copolymer may use a copolymer including an acrylic monomer, an aromatic vinyl monomer, and a maleimide monomer.

In the copolymer including an acrylic monomer, an aromatic vinyl monomer, and a maleimide monomer, the weight ratio of each monomer is preferably (38~88):(1~30): (1~10).

Particularly, in the optical film according to the present invention, a maleimide monomer may be contained in an amount of about 1 to about 10 parts by weight, preferably about 3 to about 7 parts by weight, based on 100 parts by weight of the copolymer including an acrylic monomer, an aromatic vinyl monomer, and a maleimide monomer to increase the glass transition temperature of the shell. Accordingly, the glass transition temperature of the optical film may be increased without greatly increasing the molecular weight of the shell.

When the film contains the maleimide monomer in an amount of less than about 1 part by weight, the film may not have sufficient heat resistance. When the maleimide monomer is contained at more than about 10 parts by weight, the graft ratio may be decreased and compatibility with the acrylic resin may be deteriorated to generate haze when the film is extruded.

Examples of each monomer constituting the shell are the same as examples of components of the acrylic resin.

The shell of the core-shell type graft copolymer may further include an acrylonitrile monomer as an additional comonomer. The acrylonitrile monomer may be at least one selected from the group consisting of acrylonitrile, methacrylonitrile, and ethacrylonitrile.

The acrylonitrile monomer is preferably contained in an amount of about 10 parts or less by weight based on 100 parts of a copolymer including an acrylic monomer, an aromatic vinyl monomer, and a maleimide monomer.

The core-shell type graft copolymer uses a copolymer including a conjugate diene rubber, an acrylic monomer, an aromatic vinyl monomer, and a maleimide monomer, and may be graft-polymerized to have a core-shell structure by a method known in the art. For example, a typical emulsion polymerization method may be used. Here, the graft ratio is preferably about 30% to about 80%.

The core-shell type graft copolymer is characterized in that it has a weight average molecular weight of about 80,000 to about 300,000, preferably about 80,000 to about 200,000. When weight average molecular weight is more than about 300,000, it may be helpful in heat resistance, but there may be problems in production and processing.

In the optical film according to the present invention, the weight ratio of the acrylic resin and the core-shell type graft copolymer is preferably (60~99):(1~40).

In the optical film according to the present invention, the thickness of the optical film is preferably about 20 μm to about 100 μm, but it is not limited thereto.

In addition, the optical film may have a glass transition temperature of about 110° C. or more, a coefficient of thermal expansion (CTE) of about 120 or less, and a haze of about 2.0% or less.

Since the optical film according to the present invention has excellent properties such as glass transition temperature, CTE, haze, and the like, it can be seen that transparency, heat resistance, optical isotropic properties, and the like are excellent. Accordingly, the film may be used for various purposes, such as a polarizing plate protective film and the like to replace an expensive TAC film which has been conventionally used.

In addition, a method of manufacturing an optical film according to the present invention includes preparing a resin composition including an acrylic resin and a core-shell type graft copolymer wherein the core includes a conjugate diene rubber, and the shell includes an acrylic monomer, an aromatic vinyl monomer, and a maleimide monomer, and using the resin composition to form the film.

In the method of preparing the optical film according to the present invention, a general additive, for example, a plasticizer, a lubricant, an impact modifier, a stabilizing agent, an ultraviolet ray absorption agent, and the like may be added to the resin composition.

In particular, when the optical film according to the present invention is used as a protective film of a polarizer, in order to protect the polarizer and the liquid crystal panel from external ultraviolet rays, an ultraviolet ray absorption agent may be added to the copolymer resin. Examples of the ultraviolet ray absorption agent may include, but are not specifically limited to, a benzotriazole ultraviolet ray absorption agent and a triazine ultraviolet ray absorption agent. A hindered amine light stabilizer such as bis(2,2,6,6-tetramethyl-4-piperidyl)sebaceate may be used. Tinuvin 328, Tinuvin 321, and Tinuvin 360 may be used. Igafos 168, Iganox 1076, Iganox 245, and the like may be added as a thermal stabilizing agent.

In the method of manufacturing the optical film according to the present invention, a method of forming the film may be one known in the art. Specifically, a casting method, an extrusion process, and the like may be used.

In addition, the present invention provides a retardation film including an acrylic resin and a core-shell type graft copolymer wherein the core includes a conjugate diene rubber, and the shell includes an acrylic monomer, an aromatic vinyl monomer, and a maleimide monomer.

In the retardation film according to the present invention, since information on the acrylic resin, the conjugate diene rubber, the acrylic monomer, the aromatic vinyl monomer, the maleimide monomer, and the core-shell type copolymer is the same as what is described above, a specific description thereof will be omitted.

The retardation film according to the present invention may have an in-plane retardation value of about 100 nm to about 120 nm, represented by Mathematical Formula 1 and a thickness retardation value of about 20 nm to about 60 nm, represented by Mathematical Formula 2, but it is not limited thereto.

Since the retardation film according to the present invention may provide uniform and stable in-plane retardation and thickness retardation, it may be used as a retardation film in various liquid crystal mode image display devices.

In particular, the retardation film according to the present invention may be applied to an IPS mode image display device, but it is not limited thereto.

In addition, the method of manufacturing the retardation film according to the present invention includes preparing a resin composition including an acrylic resin and a core-shell type graft copolymer wherein the core includes a conjugate diene rubber, and the shell includes an acrylic monomer, an aromatic vinyl monomer, and a maleimide monomer, using the resin composition to form the film, and uniaxially or biaxially stretching the film.

In the method of manufacturing the retardation film according to the present invention, the stretching may be performed at a temperature range of preferably ($T_g$−30° C.) to ($T_g$+30° C.) and more preferably ($T_g$−30° C.) to ($T_g$+20° C.) based on the glass transition temperature ($T_g$) of the resin composition. In addition, the stretching speed and the stretching ratio may be appropriately controlled to be within a range capable of achieving the object of the present invention.

The optical film according to the present invention may be used as a polarizer protective film. In this case, the surface may be modified in order to improve the adhesion strength thereof. Examples of the modifying method include a method of treating a surface of the protective film by using corona treatment, plasma treatment, UV treatment, and the like, and a method of forming a primer layer on the surface of the protective film. Both the methods may be simultaneously used. The type of primer is not specifically limited, but it is preferable to use a compound having a reactive functional group such as a silane coupling agent.

A polarizing plate including the optical film according to the present invention as a protective film includes a polarizer and a protective film provided on at least one side of the polarizer, and may have a structure in which at least one of the protective films is the optical film according to the present invention.

In the present invention, any polarizer may be used as long as the polarizer is known in the art, and for example, a film which is made of polyvinyl alcohol (PVA) containing iodine or dichromatic dyes may be used. The polarizer may be produced by applying iodine or dichromatic dyes on the PVA film. However, the method of producing the polarizer is not specifically limited. In the specification, the polarizer does not include the protective film, and the polarizing plate includes the polarizer and the protective film.

The adhesion of the polarizer and the protective film may be performed by using an adhesive layer. Examples of the adhesive which may be used to combine the protective film and the polarizer are not limited as long as the adhesive is known in the art. Examples of the adhesive include, but are not limited to, a one- or two-liquid type polyvinyl alcohol (PVA) adhesive, a polyurethane adhesive, an epoxy adhesive, a styrene-butadiene rubber (SBR) adhesive, or a hot melt adhesive.

Among the adhesives, a polyvinyl alcohol adhesive may be used. In particular, an adhesive that includes a polyvinyl alcohol resin containing an acetacetyl group and an amine metal compound crosslinking agent may be used. The adhesive for the polarizing plate may include about 100 parts by weight of the polyvinyl alcohol resin containing the acetacetyl group and about 1 to about 50 parts by weight of the amine metal compound crosslinking agent.

The polyvinyl alcohol resin is not specifically limited as long as the resin is capable of desirably attaching the polarizer and the protective film to each other, and has excellent optical penetration and no consecutive change such as yellowing. In consideration of a desirable crosslinking reaction to the crosslinking agent, a polyvinyl alcohol resin containing an acetacetyl group may be used.

The degrees of polymerization and saponification of the polyvinyl alcohol resin are not specifically limited as long as the polyvinyl alcohol resin contains an acetoacetyl group, but it is preferable that the degree of polymerization may be about 200 to about 4,000 and the degree of saponification may be about 70 mol % to about 99.9 mol %. In consideration of a desirable mixing to the contained material according to the free movement of molecules, it is more preferable that the degree of polymerization may be about 1,500 to about 2,500 and the degree of saponification may be about 90 mol % to about 99.9 mol %. In connection with this, it is preferable that the polyvinyl alcohol resin contain the acetacetyl group in an amount of about 0.1 mol % to about 30 mol %. In the above-mentioned range of the acetaceyl group, the reaction to the crosslinking agent may be desirably performed and the adhesive may have a desired water resistance and adhesion strength.

The amine metal compound crosslinking agent is a water-soluble crosslinking agent that contains a functional group having reactivity to the polyvinyl alcohol resin, and may be a metal complex containing an amine ligand. Examples of metal that is capable of being applied to the metal complex include a transition metal such as zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), platinum (Pt), and the like. Examples of the ligand that is coupled with the central metal may include any ligand as long as it contains at least one amine group such as a primary amine, a secondary amine (diamine), a tertiary amine, or ammonium hydroxide. It is preferable that the amount of the crosslinking agent used may be controlled to be within the range of about 1 to about 50 parts by weight based on 100 parts by weight of the polyvinyl alcohol resin. In the above-mentioned range, it is possible to provide sufficiently significant adhesion strength to a target adhesive and to improve the storage stability (pot life) of the adhesive.

It is preferable that the pH of the adhesive aqueous solution including the polyvinyl alcohol resin containing the acetacetyl group and the amine metal compound crosslinking agent may be adjusted to about 9 or less by using a pH adjusting agent. More preferably, the pH may be adjusted to more than about 2 and about 9 or less, and even more preferably, about 4 to about 8.5.

The bonding of the polarizer and the protective film may be performed according to an attachment method using an adhesive. That is, the adhesive is applied on the surface of a protective film for a polarizer or a PVA film that is a polarizer by using a roll coater, a gravure coater, a bar coater, a knife coater, a capillary coater, or the like. Before the adhesive is completely dried, the protective film and a polarizing film are combined with each other by using heat pressing or pressing at normal temperature by means of a combination roll. When a hot melt type adhesive is used, a heat pressing roll must be used.

When a polyurethane adhesive is used, a polyurethane adhesive produced by using an aliphatic isocyanate compound which does not cause yellowing due to light may be used. When a one- or two-liquid type dry laminate adhesive or an adhesive having relatively low reactivity in respect to isocyanate and a hydroxy group is used, a solution type adhesive which is diluted with an acetate solvent, a ketone solvent, an ether solvent, or an aromatic solvent may be used. In this connection, it is preferable that the adhesive have low viscosity of about 5000 cps or less. Preferably, the adhesive has excellent storage stability and light transmittance of 90% or more at a wavelength of about 400 to about 800 nm.

A adhesive agent may be used as long as it shows sufficient cohesive power. It is preferable that after the combination, an adhesive agent is sufficiently cured by heat or UV light to show resulting mechanical strength as high as that obtained with an adhesive and the interface adhesion of the adhesive agent is so strong so that delamination is possible only when one of both films bonded to each other is destroyed.

Specific examples of the adhesive agent may include natural rubber, synthetic rubber, or elastomer, a vinyl chloride/vinyl acetate copolymer, polyvinyl alkyl ether, polyacrylate, modified polyolefin adhesive, having excellent optical transparency, and a curable adhesive agent containing a curing agent such as isocyanate.

The manufactured polarizing plate may be used for the various purposes. Specifically, the polarizing plate may be applied to an image display device such as a polarizing plate for liquid crystal displays (LCD) and a polarizing plate for preventing the reflection of the organic EL display device. In addition, the optical film according to the present invention may be applied to a complex polarizing plate in which various optical layers such as various types of functional layers, for example, a retardation plate such as a λ/4 plate and a λ/2 plate, an optical diffusion plate, a viewing angle enlargement plate, a luminance improvement plate, and a reflection plate are combined with each other.

The polarizing plate may include an adhesive agent layer on at least one side thereof so as to be easily applied to image display devices and the like. In addition, the polarizing plate may further include a release film on the adhesive agent layer in order to protect the adhesive agent layer until the polarizing plate is applied to an image display device.

In addition, the present invention provides an electronic device that includes the optical film or the retardation film. The electronic device may be an image display device such as LCDs.

For example, the present invention provides an image display device that includes a light source, a first polarizing plate, a liquid crystal cell, and a second polarizing plate, which are sequentially stacked, and also includes the optical film or the retardation film according to the present invention as at least one protective film of the first polarizing plate and the second polarizing plate or a retardation film that is provided between at least one of the first polarizing plate and the second polarizing plate and the liquid crystal cell.

The liquid crystal cell includes a liquid crystal layer; a substrate that is capable of supporting the liquid crystal layer; and an electrode layer to apply voltage to the liquid crystal. At this time, the polarizing plate according to the present invention may be applied to all the liquid crystal modes such as an In-Plane Switching mode (IPS mode), a Vertically Aligned mode (VA mode), an OCB mode (Optically Compensated Birefringence mode), a Twisted Nematic mode (TN mode), a Fringe Field Switching mode (FFS mode), and the like.

MODE FOR INVENTION

Hereinafter, the present invention will be described in more detail with reference to Examples. However, the following Examples are only for illustrative purposes and are not intended to limit the scope of the present invention.

EXAMPLES

Example 1

A resin composition included 72 wt % of an acrylic resin having a weight ratio of styrene-methylmethacrylate-maleic acid anhydride (SM-MMA-MAH) of 23:70:7 and a weight average molecular weight of about 130,000; and 28 wt % of a core-shell type graft copolymer including a copolymer, as a core, of about 18 parts by weight of butadiene and about 3 parts by weight of methylmethacrylate, grafted by about 56 parts by weight of methylmethacrylate, about 20 parts by weight of styrene, and about 3 parts by weight of cyclohexylmaleimide, and having a weight average molecular weight of about 100,000 and a graft ratio of about 40%. The resin composition was dry-blended, and then a same direction biaxial extruder was used to prepare a heat-resistant blend in a pellet state. The prepared pellet was dried, and then an extruded film with a thickness of about 80 μm (micrometer) was prepared by using an extruder including a T-dye. Characteristics of the film as a polarizer protective film were measured, and the film was uniaxially stretched at $T_g-10°$ C. in a transverse direction (TD) to prepare an IPS mode retardation film. Characteristics of the resulting film were measured, and the results are shown in the following Tables 1 and 2.

Example 2

A film was prepared in the same manner as in Example 1, except for using about 5 parts by weight of cyclohexylmaleimide of the core-shell type graft copolymer, and then characteristics of the film were measured. The results are shown in the following Tables 1 and 2.

Example 3

A film was prepared in the same manner as in Example 1, except that the core-shell type graft copolymer had a weight average molecular weight of about 150,000, and then characteristics of the film were measured. The results are shown in the following Tables 1 and 2.

Example 4

A film was prepared in the same manner as in Example 1, except that an acrylic resin having a weight ratio of styrene-methylmethacrylate-maleic acid anhydride-cyclohexylmaleimide (SM-MMA-MAH-CHMI) of 23:70:5:2 and having a weight average molecular weight of about 130,000 was used and about 5 parts by weight of cyclohexylmaleimide was used in the core-shell type graft copolymer, and then characteristics of the film were measured. The results are shown in the following Tables 1 and 2.

Comparative Example 1

A film was prepared in the same manner as in Example 1, except that cyclohexylmaleimide was not included in the core-shell type graft copolymer, and then characteristics of the film were measured. The results are shown in the following Tables 1 and 2.

Comparative Example 2

A film was prepared in the same manner as in Example 1, except that cyclohexylmaleimide was not included in the core-shell type graft copolymer and the copolymer had a weight average molecular weight of about 200,000, and then characteristics of the film were measured. The results are shown in the following Tables 1 and 2.

TABLE 1

| | Acrylic resin CHMI (wt %) | Core-shell type graft copolymer CHMI (part by weight) | Mw |
|---|---|---|---|
| Example 1 | 0 | 3 | 100,000 |
| Example 2 | 0 | 5 | 100,000 |
| Example 3 | 0 | 3 | 150,000 |
| Example 4 | 2 | 5 | 100,000 |
| Comparative Example 1 | 0 | 0 | 100,000 |
| Comparative Example 2 | 0 | 0 | 200,000 |

CHMI: Cyclohexylmaleimide

TABLE 2

| | Haze, % | Film surface state | Retardation before stretching ($R_{in}/R_{th}$) | Retardation after uniaxial stretching ($R_{in}/R_{th}$) | $T_g$ (° C.) | Coefficient of Thermal Expansion (CTE, ppm/K) |
|---|---|---|---|---|---|---|
| Example 1 | 0.8 | ◎ | 1.2/2.0 | 100/45 | 120.4 | 78 |
| Example 2 | 1.0 | ◎ | 1.0/2.2 | 110/40 | 122.7 | 71 |
| Example 3 | 1.2 | ○ | 0.8/2.0 | 110/37 | 121.0 | 76 |
| Example 4 | 0.8 | ◎ | 1.2/2.0 | 100/40 | 122.2 | 72 |
| Comparative Example 1 | 0.7 | ◎ | 1.1/2.0 | 100/47 | 116.2 | 109 |
| Comparative Example 2 | 3.2 | X | 1.2/2.4 | 110/45 | 118.5 | 97 |

(1) Haze: measured in accordance with ASTM 1003.
(2) Mw (Weight Average Molecular Weight): measured by dissolving a pellet in tetrahydrofuran and subjecting the solution to gel permeation chromatography (GPC).
(3) Film surface state: The sizes and numbers of bubbles generated on a film surface were visually measured when the film was pressed (◎: Very good, ○: Good, Δ: Fair, X: Poor).
(4) Retardation value ($R_{in}/R_{th}$): measured by using a AxoScan from Axometrics, Inc. after stretching a film at glass transition temperature.
(5) Glass Transition Temperature ($T_g$): measured by using a Differential Scanning Calorimeter (DSC) from TA Instrument, Inc.
(6) Coefficient of Thermal Expansion (CTE): measured in a temperature range of about 40° C. to about 90° C. by using a Differential Scanning Calorimeter (DSC) from TA Instrument, Inc.

From the results in Tables 1 and 2, it can be seen that the optical film according to the present invention may be used for various purposes such as a polarizer protective film the like to replace an expensive TAC film that has been conventionally used because the film has excellent impact resistance and heat resistance and the film also has excellent optical isotropic properties before stretching, and the optical film may be also used as a retardation film because the film may provide uniform and stable retardation after stretching. While the present invention has been shown and described in connection with the exemplary embodiments, it will be apparent to those skilled in the art that modifications and variations can be made without departing from the spirit and scope of the invention as defined by the appended claims.

The invention claimed is:

1. A method of manufacturing an optical film, the method comprising:
    preparing a resin composition comprising an acrylic resin and a core-shell type graft copolymer, wherein the core comprises a conjugate diene rubber, and the shell is a copolymer comprising an acrylic monomer, an aromatic vinyl monomer, and a maleimide monomer, and
    using the resin composition to form the film,
    wherein a weight ratio of each monomer of the copolymer comprising the acrylic monomer, the aromatic vinyl monomer, and the maleimide monomer is 38-88:1-30:1-10.

2. A method of manufacturing a retardation film, the method comprising:
    preparing a resin composition including an acrylic resin and a core-shell type graft copolymer wherein the core comprises a conjugate diene rubber, and the shell is a copolymer comprising an acrylic monomer, an aromatic vinyl monomer, and a maleimide monomer,
    using the resin composition to form the film, and
    uniaxially or biaxially stretching the film,
    wherein a weight ratio of each monomer of the copolymer comprising the acrylic monomer, the aromatic vinyl monomer, and the maleimide monomer is 38-88:1-30:1-10.

3. A polarizing plate comprising:
a polarizer; and
a protective film provided on at least one side of the polarizer,
wherein the protective film is the optical film prepared by the method of claim 1.

4. An electronic device comprising the polarizing plate of claim 3.

* * * * *